G. A. ORR.
TIRE FILLER.
APPLICATION FILED FEB. 9, 1918.
1,282,622. Patented Oct. 22, 1918.
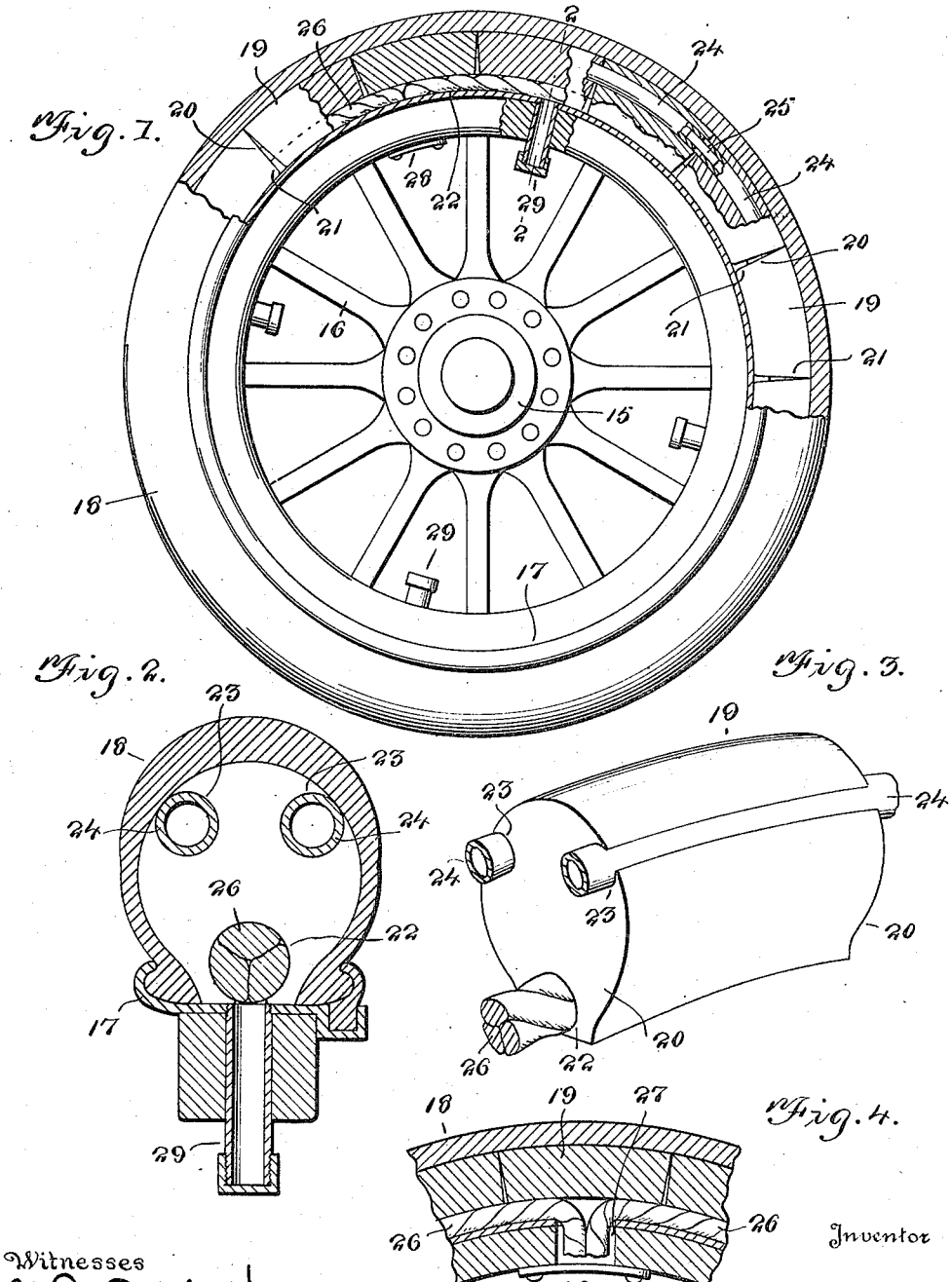
Witnesses
E. R. Ruppert.
Inventor
G. A. Orr
By Victor J. Evans
Attorney

UNITED STATES PATENT OFFICE.

GAYLORD A. ORR, OF CRIPPLE CREEK, COLORADO.

TIRE-FILLER.

1,282,622.  Specification of Letters Patent.  Patented Oct. 22, 1918.

Application filed February 9, 1918. Serial No. 216,270.

*To all whom it may concern:*

Be it known that I, GAYLORD A. ORR, a citizen of the United States, residing at Cripple Creek, in the county of Teller and State of Colorado, have invented new and useful Improvements in Tire-Fillers, of which the following is a specification.

This invention relates to fillers for tire casings and it has for its object to produce a filler of simple and improved form by the use of which the casing may be constantly maintained in a properly expanded condition for successful operation.

A further object of the invention is to produce a filler composed of a plurality of sections or units molded or otherwise made of rubber or other suitable material, said sections being assembled in annular form by means of rubber tubing and said sections or units being, furthermore, socketed for the reception of a connecting member made of fibrous material, such as ordinary rope which, by wetting the same, is expanded, thereby expanding the sections or units and causing the same to fit snugly and compactly within the tire casing.

A further object of the invention is to produce means whereby the fibrous core may be maintained in a moistened condition.

A further object of the invention is to produce a construction whereby the fibrous core will be free to contract longitudinally when expanded circumferentially by wetting the same.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawing:

Figure 1 is a side elevation of a wheel and tire casing, the latter being equipped with the improved filler, parts having been broken away to illustrate the construction.

Fig. 2 is a transverse sectional view taken on the line 2—2 in Fig. 1.

Fig. 3 is a perspective detail view of one of the filler units or sections showing also portions of the anchoring tubes and of the fibrous core.

Fig. 4 is a vertical sectional view of a wheel including a rim, casing and filler constructed in accordance with the invention.

Corresponding parts in the several figures are denoted by like characters of reference.

For the purpose of properly illustrating the invention, an ordinary automobile wheel has been shown, the same including a hub 15, spokes 16, rim 17 and tire casing 18 which latter may be of the clencher or any other well known type.

The filler within the tire casing is composed of a plurality of units or sections 19 of any desired length and of proper cross section to fit reasonably snugly within the casing, said units being also of arcuate form lengthwise so as to fit properly within the casing in connection with which they are used. The ends of each unit, indicated at 20, are tapered in the direction of the axis of the tire casing so that while the said units may abut on each other at the outer circumference, they will be spaced apart along the inner circumference producing wedge-shaped interspaces 21. This construction adapts units of standard form and size to be employed in connection with casings of different diameters, it being evident that when the units are used in connection with a casing of small diameter, the end faces of the respective units will more nearly approach each other along the inner circumference while, when the units are used in connection with a casing of large diameter, the end faces of the units will become further spaced apart along the inner circumference.

Each unit is provided with sockets of approximately circular cross section formed lengthwise therein, one of said sockets, 22, being formed in the inner face portion thereof which in practice lies adjacent to the rim of the wheel, the two remaining sockets 23 being formed in the side faces of the unit adjacent to the outermost portion hereof. Fitted in the sockets 23 are tubes 24 of rubber or other material whereby any desired number of units may be assembled to form an annulus that will fit within the tire casing 18. The ends of each tube 24 are connected together by a plug 25 which is cemented or otherwise secured in the ends of the tube. Fitted in the socket 22 is a core of fibrous material such as an ordinary rope 26. The rim 17 of the wheel is provided with a slot 27 through which the ends of the rope 26 may extend, the slot 27 being covered by means of a patch 28 which may be bolted or otherwise secured on the rim.

The rim 17 of the wheel is equipped with a plurality of cups or containers 29 connecting at their inner ends with the sockets 22 of some of the filler units, said cups being adapted to contain water whereby fibrous core 26 may be saturated causing circumferential expansion and longitudinal contraction thereof. In assembling the parts of the device together, the fibrous core is inserted in a perfectly dry state and the ends thereof are permitted to project through the slot 27. After placing the tire on the rim but before securing it in position by the usual clamping means, the wheel is placed or rotated in a tank or vessel containing water until the core has become thoroughly saturated and expanded, thereby expanding the filler units within the casing. The casing will thus be thoroughly expanded to a condition for most efficient service. To compensate for loss of moisture by evaporation, the cups 29 may be filled with water whereby the core will be maintained in a saturated condition as long as may be desired.

What is claimed as new is:

1. A filler for tire casings, comprising a plurality of resilient arcuate units assembled in annular form, said units having longitudinal sockets in their inner faces, and a fibrous core seated in said sockets, said core having free inwardly projecting ends to compensate for longitudinal contraction of the core.

2. A filler for tire casings, comprising a plurality of resilient arcuate units assembled in annular form, said units having longitudinal sockets in their inner faces and a fibrous core seated in said sockets, said core having free inwardly projecting ends to compensate for longitudinal contraction of the core; in combination with means for saturating the core to produce circumferential expansion and longitudinal contraction thereof.

In testimony whereof I affix my signature.

GAYLORD A. ORR.

Copies of this patent may be obtained for five cents each, by addressing the "Commissioner of Patents, Washington, D. C."